Patented July 12, 1932

1,866,564

UNITED STATES PATENT OFFICE

CHRISTIAN JOHANNES HANSEN, OF ESSEN, GERMANY, ASSIGNOR, BY MESNE ASSIGNMENTS, TO THE KOPPERS COMPANY, OF PITTSBURGH, PENNSYLVANIA, A CORPORATION OF DELAWARE

PROCESS FOR OBTAINING MIXTURES OF AMMONIUM SULPHATE AND DI-AMMONIUM PHOSPHATE

No Drawing. Application filed May 4, 1931, Serial No. 535,078, and in Germany May 5, 1930.

The invention relates to the production of fertilizers consisting of ammonium sulphate and di-ammonium prosphate. Fertilizers of this type are known to be very valuable because they contain both nitrogen and phosphoric acid and because, as the two components of the mixed fertilizer, namely the ammonium sulphate and di-ammonium phosphate, have the same nitrogen content, it is possible by using suitable mixing proportions, to produce mixed fertilizers in any desired proportion of nitrogen to phosphoric acid, which is of course of great importance in agriculture.

Mixed fertilizers of this type have been obtained hitherto by mixing the two crystallized constituents. It has not yet been possible however to produce said mixed fertilizer by vaporizing or crystallizing by cooling from salts which contain both ammonium sulphate and ammonium phosphate. This is due on the one hand to the fact that ammonium sulphate and ammonium phosphate have a considerably different solubility and on the other hand to the fact that the di-ammonium phosphate is very strongly hydrolyzed, so that in the vaporization of a di-ammonium phosphate solution large quantities of ammonia escape. The consequence is that in vaporizing a solution of ammonium sulphate and ammonium phosphate, a salt is produced which consists mainly of mono-ammonium phosphate with a small proportion of ammonium sulphate.

Now the subject of the invention is a process which enables a mixture of solid ammonium sulphate and di-ammonium phosphate in the same proportion as in the initial solution to be produced from a solution of ammonium sulphate and ammonium phosphate in a continuous process of operation. The process according to the invention consists in bringing the ammonium sulphate and ammonium phosphate containing initial solution continuously or intermittently into a solution saturated with ammonium sulphate and mono-ammonium phosphate, to which heat is supplied for the purpose of evaporating the water, whereby a mixture of solid ammonium sulphate and solid mono-ammonium phosphate is obtained in the same proportion as in the solution to be vaporized, whereupon the solid salt mixture thus obtained is treated with a cold solution saturated with ammonium sulphate and di-ammonium phosphate, to which ammonia is supplied, whereby the solid mono-ammonium phosphate of the salt mixture is transformed into solid di-ammonium phosphate.

The invention also provides a method of producing mixtures of solid ammonium phosphate and di-ammonium phosphate from solutions containing ammonium sulphate and ammonium phosphate, wherein the initial ammonium sulphate ammonium phosphate solution is first treated in the same manner as described above, but wherein the ammonium sulphate and di-ammonium phosphate-containing mother liquor separated from the finished ammonium sulphate-di-ammonium phosphate salt mixture is used, after ammonia has again been added, for transforming further quantities of the ammonium sulphate mono-ammonium phosphate salt mixture formed by vaporizing the initial solution.

In carrying out the process according to the invention a portion of the salt solution to be treated which contains ammonium sulphate and ammonium phosphate (the latter either as mono-ammonium phosphate or as di-ammonium phosphate) is first confined in a single or multi-stage vaporizer at ordinary, decreased or elevated pressure. Solid ammonium sulphate first separates, whilst the ammonium phosphate remains practically wholly in solution. The vaporizing is continued until the solution is saturated with ammonium sulphate and mono-ammonium phosphate, i. e. until both salts commence to separate off in large quantities. The solid salts are then separated from the clear salt solution, and the solution saturated with ammonium sulphate and mono-ammonium phosphate is brought into a continuously driven vaporizing apparatus, in which it is heated at decreased, normal, or elevated pressure.

The ammonium sulphate and ammonium phosphate containing solution to be worked into solid salt is added to the solution contained in the vaporizer, continuously or intermittently. In the further course of the vaporizing process ammonium sulphate and mono-ammonium phosphate separate simultaneously from the mixed solution, owing to the fact that the vaporizer solution was first saturated with ammonium sulphate and mono-ammonium phosphate in the same proportion in which ammonium sulphate and ammonium phosphate is present in the initial liquid added to the vaporizer solution. Care should be taken that the liquid in the vaporizer is of approximately constant volume. The solid salt mixture consisting of ammonium sulphate and mono-ammonium phosphate which separates in the vaporizer in the course of the process is removed from the apparatus continuously or intermittently, freed from the adhering vaporizer solution by filtration, centrifuging or other suitable method, and brought into a solution saturated with ammonium sulphate and di-ammonium phosphate, preferably at room temperature. For the purpose of changing the mono-ammonium phosphate into di-ammonium phosphate, ammonia is added to this cold solution, preferably in the form of concentrated ammonia water or better still in the form of gaseous ammonia. By the treatment with the ammoniacal solution saturated with ammonium sulphate and di-ammonium phosphate, the solid mono-ammonium phosphate is transformed into solid di-ammonium phosphate.

The transformation of the mono-ammonium phosphate into di-ammonium phosphate may be effected either in an agitator or in the usual manner on the filter or the like used for separating the solid salt from the mother liquor, the salt in the latter case being washed several times on the filter with the ammoniacal ammonium sulphate-di-ammonium phosphate solution.

In the process according to the invention the finished salt mixture is finally separated from the mother liquor by suction or centrifuging, said liquor being then used, preferably after adding ammonia, for treating further quantities of solid sulphate and solid ammonium phosphate containing salts.

The process according to the invention is of particular importance in cases in which solutions of ammonium thionates, as obtained in the known processes for removing ammonia and hydrogen sulphide from gases by means of solution of thionates, and which if desired may also contain ammonium thiocyanate, are transformed by heating with phosphoric acid, preferably under pressure, into elementary sulphur and solutions which contain both ammonium sulphate and ammonium phosphates, i. e. either mono or di-ammonium phosphate or mixtures of the two, according to the content of ammonia in the reaction solution.

The process according to the invention may be carried out for instance in the following manner:

170 kg. of a solution containing 52 kg. ammonium sulphate and 70 kg. mono-ammonium phosphate, together with 42 kg. water are introduced into a vaporizing apparatus. Such a solution is saturated with ammonium sulphate and mono-ammonium phosphate at about 110°. The vaporizer liquid is held at about this temperature at normal pressure and the reaction solution containing ammonium sulphate and mono-ammonium phosphate is then added continuously in a slow current, i. e. at the same speed at which water evaporates. This solution contains about 325 gr. ammonium sulphate and 192 gr. mono-ammonium phosphate to the litre. In the course of the vaporization process solid ammonium sulphate and solid ammonium phosphate separate out in equal quantities in the vaporizer. The solid salt mixture obtained is progressively removed from the vaporizer and after the mother liquor has been removed by centrifuging, is brought into a cold aqueous solution containing 512 gr. di-ammonium phosphate and 480 gr. ammonium sulphate to the litre. For every 100 kg. mono-ammonium phosphate which are supplied to this latter solution, 14.65 kg. gaseous ammonia are introduced into it, whereby the mono-ammonium phosphate is practically wholly transformed into di-ammonium phosphate, without a solution of the salt being formed.

The salt mixture separating from the ammonium sulphate-di-ammonium phosphate solution after the treatment with gaseous ammonia, which mixture now consists of ammonium sulphate and di-ammonium phosphate in the proportion of about 3:2, is separated from the ammonium sulphate-di-ammonium phosphate solution and dried, after which it is ready for sale.

I claim:

1. Method of producing salt mixtures of ammonium sulphate and di-ammonium phosphate from solutions containing ammonium sulphate and ammonium phosphates in any proportions, which consists in heating a solution saturated with ammonium sulphate and di-ammonium phosphate, adding to this solution the solution containing ammonium sulphate and ammonium phosphates which is to be treated, removing salt which separates out of the solution, treating the salt with a solution which is saturated with ammonium sulphate and di-ammonium phosphate and to which ammonia is added, and finally separating the salt from the latter solution, and drying the salt.

2. The method of producing salt mixtures of ammonium sulphate and di-ammonium phosphate from solutions containing ammonium phosphates and ammonium sulphate in any proportions, which consists in heating a solution saturated with ammonium sulphate and di-ammonium phosphate, adding to this solution the solution containing ammonium sulphate and ammonium phosphates which is to be treated, in such a manner that the volume of the mixed solution remains approximately the same during the vaporizing operation, removing the salt which separates out of the solution, treating the salt with a solution which is saturated with ammonium sulphate and di-ammonium phosphate and to which ammonia is added, and finally separating the salt from the latter solution and drying the salt.

3. The method of producing salt mixtures of ammonium sulphate and di-ammonium phosphate from solutions containing ammonium sulphate and ammonium phosphates in any proportions which consists in heating a solution saturated with ammonium sulphate and di-ammonium phosphate at decreased pressure, adding to this solution the solution containing ammonium sulphate and ammonium phosphates which is to be treated, removing the salt which separates out of the solution, treating the salt with a solution which is saturated with ammonium sulphate and di-ammonium phosphate and to which ammonia is added, and finally separating the salt from the latter solution and drying the salt.

4. The method of producing salt mixtures of ammonium sulphate and di-ammonium phosphate from solutions containing ammonium sulphate and ammonium phosphates in any proportions, which consists in heating a solution saturated with ammonium sulphate and di-ammonium phosphate, adding to this solution the solution containing ammonium sulphate and ammonium phosphates which is to be treated, removing the salt which separates out of the solution, treating the salt with a solution which is saturated with ammonium sulphate and di-ammonium phosphate and to which ammonia is added, finally separating the salt from the latter solution and drying the salt, adding ammonia to the solution saturated with ammonium sulphate and di-ammonium phosphate which is separated from the salt mixture, and subsequently using this solution once more for treating the salt removed from the vaporized initial solution.

In testimony whereof I affix my signature.

CHRISTIAN JOHANNES HANSEN.